(12) United States Patent
Claffy

(10) Patent No.: US 7,582,830 B2
(45) Date of Patent: Sep. 1, 2009

(54) OVERSIZED ELECTRICAL WALL PLATE

(76) Inventor: Joseph Claffy, 5032 Lawn Ave., Western Springs, IL (US) 60558

(*) Notice: Subject to any disclaimer, the term of this patent is extended or adjusted under 35 U.S.C. 154(b) by 0 days.

(21) Appl. No.: 11/860,124

(22) Filed: Sep. 24, 2007

(65) Prior Publication Data

US 2009/0078444 A1    Mar. 26, 2009

(51) Int. Cl.
*H02G 3/18* (2006.01)
(52) U.S. Cl. ............................ 174/67; 174/66; 439/142
(58) Field of Classification Search ................... 174/66, 174/67; 220/241, 242; 439/142, 148, 107
See application file for complete search history.

(56) References Cited

U.S. PATENT DOCUMENTS

| | | | | | |
|---|---|---|---|---|---|
| 1,280,655 | A | * | 10/1918 | Briggs | 174/66 |
| 4,605,817 | A | * | 8/1986 | Lopez | 174/67 |
| 4,640,564 | A | | 2/1987 | Hill | |
| 4,671,587 | A | | 6/1987 | Lerner et al. | |
| 5,744,750 | A | * | 4/1998 | Almond | 174/541 |
| 5,907,126 | A | | 5/1999 | Cancellieri et al. | |
| 6,066,805 | A | * | 5/2000 | Bordwell et al. | 174/66 |
| 6,417,450 | B1 | * | 7/2002 | Young | 174/66 |
| 7,026,564 | B1 | | 4/2006 | Savicki et al. | |

* cited by examiner

*Primary Examiner*—Dhiru R Patel
(74) *Attorney, Agent, or Firm*—Vedder Price PC

(57) ABSTRACT

A wall plate for securing an electrical outlet to a wall or other planar surface having channels that pass through recessed bores on an exterior surface and conduits for guiding the application of inserts for securing the electrical outlet to the wall or other planar surface.

3 Claims, 5 Drawing Sheets

OVERSIZED ELECTRICAL WALL PLATE

FIELD OF THE DISCLOSURE

This invention relates to a wall plate for an electrical outlet, and more particularly, to an oversized, one-piece, tamper-resistant wall plate securely mountable on all wall types and other planar surfaces.

BACKGROUND OF THE INVENTION

For institutional and industrial environments, wall plates for electrical outlets must withstand abuse to eliminate costly replacement. Standard electrical wall plates are unsuitable. The prior art comprises standard electrical wall plates and various wall plates with covers and safety devices used to prevent access. These include, for example, U.S. Pat. No. 5,907,126; U.S. Pat. No. 4,640,564; and U.S. Pat. No. 4,671,587.

Although these devices fulfill their restrictive and particular objectives and requirements, a standard electrical wall plate, as well as specialized embodiments of the wall plate, neither discloses nor describes a novel one-piece wall plate for mounting on a wall or other planar surface. The inventive device includes exterior and interior surfaces forming a perimeter, which has an upstanding wall communicating with the exterior and interior surfaces. The external surface defines a central opening designed for receiving the electrical outlet. Both surfaces have parallel sidewalls or members that shape the device. Corners are formed by the meeting of the parallel members or sides. Apertures or bores are adjacent the corners for receiving inserts for securely holding the wall plate and outlet in place. Channels are placed through the exterior and interior surfaces to assist the insert passing through the wall plate to be securely fastened to a wall or planar surface.

In these respects, the oversized electrical outlet wall plate, according to the present invention, substantially departs from conventional concepts and designs in the prior art, and in so doing, provides a device allowing a design for institutional and industrial environments. Prior art device cover plates may be damaged by abuse. The impact-resistant, one-piece design of the present invention does not rust or break, and therefore, withstands abuse. The large size of the wall plate provides for increased security and safety and allows it to be securely fastened to a wall or other planar surface.

SUMMARY

In view of the foregoing disadvantages of conventional types of wall plates for electric outlets, the present invention provides a new wall plate that can be utilized for safe and secure protection of electrical outlets.

The general purpose of the present invention, which is described subsequently in greater detail, is to provide a new wall plate for an electrical outlet that has many advantages over the wall plates for electrical outlets mentioned heretofore and embodies novel features that result in a new electrical outlet wall plate that is not anticipated, rendered obvious, suggested, or even implied by any of the prior art wall plates or covers for electrical outlets, either alone or in combination.

To attain this, the present invention generally comprises an exterior surface and an interior surface forming a perimeter having an upstanding sidewall. The exterior surface has an opening for access to an outlet. There are first and second parallel members, or sides, and third and fourth parallel members, or sides, that define the shape of the wall plate. Corners are formed where the parallel members or sides meet. Adjacent the corners are recessed bores or apertures. Inside the apertures are shoulders for securely holding inserts for attaching the wall plate or electrical outlet to a wall or planar surface. The apertures add a tamper-resistant feature to the wall plate because the inserts are below the plane of the exterior surface, which makes the insert difficult to manipulate. The recessed bores or apertures define a channel passing through the external and internal surfaces. The channel passes through a conduit that provides rigid support to the wall plate by abutting the wall or planar surface when the insert is properly secured in the wall or planar surface. The conduit serves as guide for the insert as it passes through the bore at the conduit's first end and into the channel and subsequently into the wall or planar surface at the second end of the conduit. The length of the conduit is substantially the same as the height of upstanding side wall at the interior surface, thereby allowing the second end of the conduit to be about the same height of the perimeter of the sidewall. This arrangement provides support and rigidity to the entire structure, since both the second end of the conduit and perimeter abut the wall or planar surface.

The foregoing is a broad outline of the more important features of the invention in order that the detailed description of the invention that follows be better understood and in order that the present contribution to the art be better appreciated.

Before describing at least one embodiment of the invention in detail, it should be understood that the invention is not limited in its application to the details of construction or arrangements of the components set forth in the following description or illustrated in the drawings. The invention is capable of other embodiments and of being practiced in various ways.

It is therefore an object of the present invention to provide a new wall plate for an electrical outlet that has the advantages mentioned herebefore.

It is another object of the present invention to provide a one-piece wall plate that is impact resistant and can be easily manufactured.

It is a further object of the present invention to provide a wall plate that is tamper resistant and has a durable and reliable construction that is not damaged under abusive conditions.

It is another object of the present invention to provide an oversized wall plate for secure mounting to a wall or other planar surface.

Even still another object of the present invention is to provide a recessed, shouldered bore for receiving inserts, with a channel and conduit for aligning the insert for placement into a wall or other planar surface.

BRIEF DESCRIPTION OF THE DRAWINGS

The invention will be better understood and objects other than those set forth above will become apparent when consideration is given to the following detailed description thereof. Such description makes reference to the accompanying drawings wherein.

DESCRIPTION OF PREFERRED EMBODIMENTS

Figure 1:
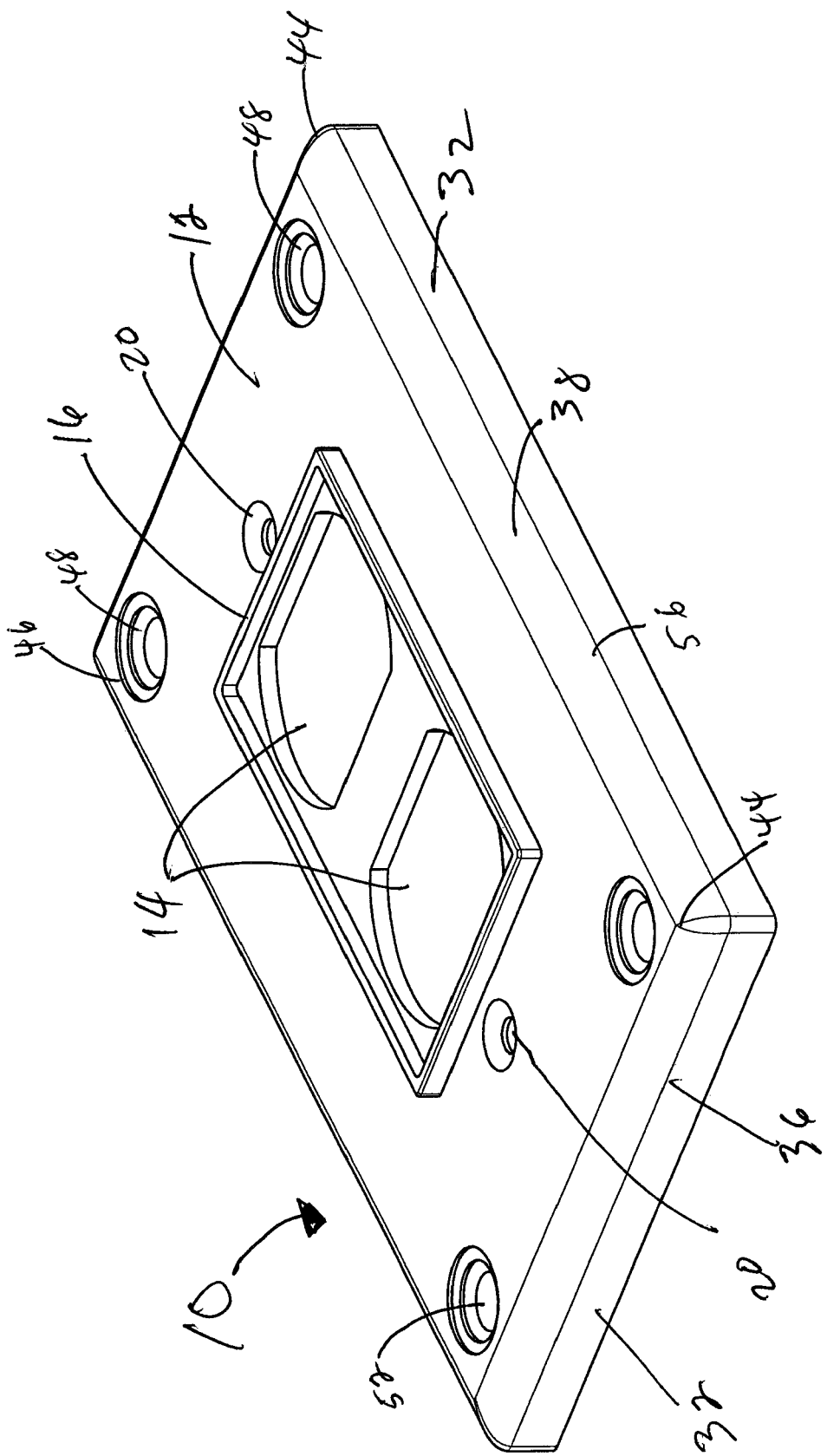
FIG. 1 is a perspective view of a new wall plate for electrical outlets according to the present invention.
Figure 2:
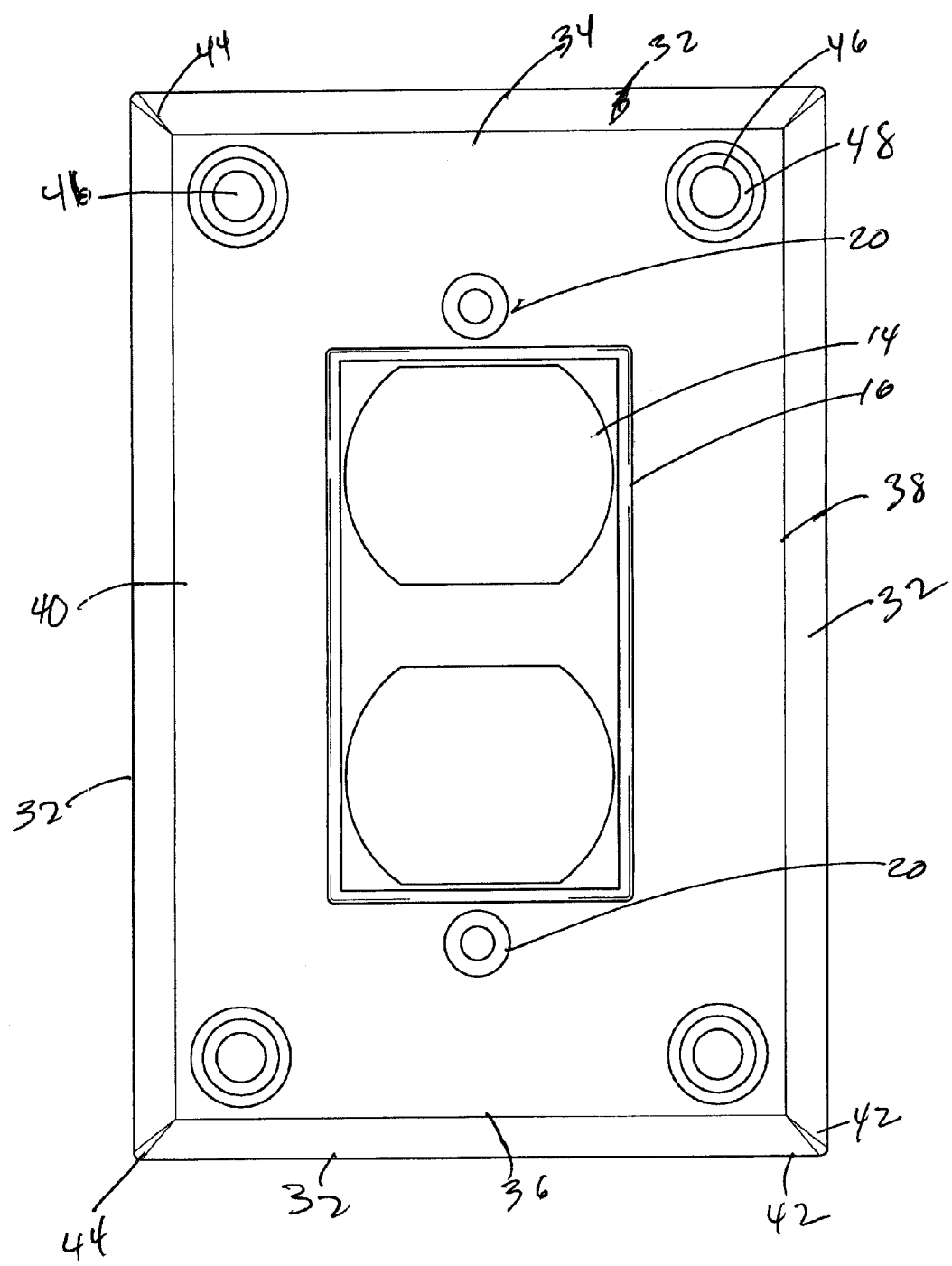
FIG. 2 is a front view of the present invention.

With reference to the drawings, and in particular to FIGS. 1-5, a new wall plate for an electrical outlet embodying the principles and concepts of the present invention and generally designated by reference to number 10 will be described.

As best illustrated in FIGS. 1-3 and 5, the wall plate 10 generally comprises a one-piece wall plate having a front side or exterior surface 12 in which apertures 14 for access to an electrical outlet 18 are placed. The number of apertures for accessing the electrical outlet can vary, and therefore, the number is not intended to be limitative. Ridge 16 surrounds the apertures and serves as a guide for inserting a plug into the electrical outlet. To secure the wall plate to electrical outlet 18, attachment openings 20 are placed in a desired location to match the receiving holes 22 in the electrical outlet. Convention screws 24 are utilized for securing the wall plate 10 to the electrical outlet 18.

Figure 5:
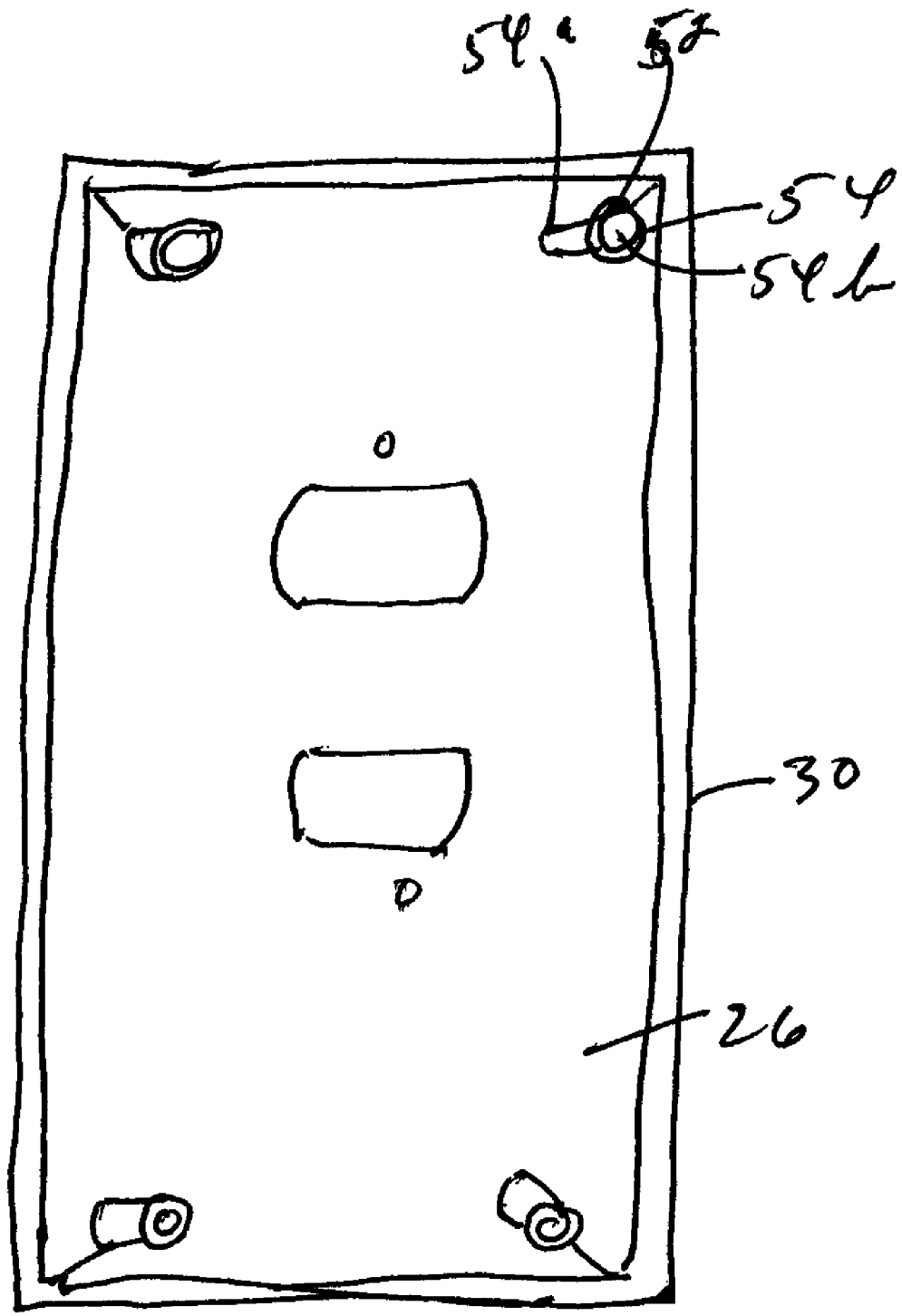
FIG. 5 is a rear perspective view of the present invention.

A back side or interior surface 26 is shown in FIG. 5. Interior surface 26 contacts the electrical outlet 18 for secure attachment to wall or other planar surface 28.

Both the interior surface 26 and exterior surface 12 meet to form perimeter 30. The perimeter 30 of the wall plate 10 is the portion of the plate that has significant contact with wall 28 upon engagement of the wall plate and electrical outlet. Perimeter 30 has a plurality of upstanding walls 32 that communicate with interior surface 26 and exterior surface 12. The upstanding walls 32 follows perimeter 30 and forms first parallel member or side 32, second parallel member or side 36, third parallel member or side 38, and fourth parallel member or side 40. Ends 42 of sides or parallel members meet to form corners 44 that define the shape of wall plate 10. Corners 44 are joined to form a radius that provides a smooth, clean appearance to the one-piece wall plate 10.

On the exterior surface 12, there is a plurality of bores 46 or apertures adjacent corners 44. The bores are recessed from the exterior surface 12 and have a shoulder 48 for readily securing an insert 50. The recessed bore 46 provides a safety measure in that it substantially prevents manipulation of insert 50. The insert 50 may be any desired attaching device, including, for example, a tamper-resistant screw, or security screw, etc. Any conventional anchoring device to be used with the screw is acceptable; however, a Nyloc nut is preferred.

Figure 3:
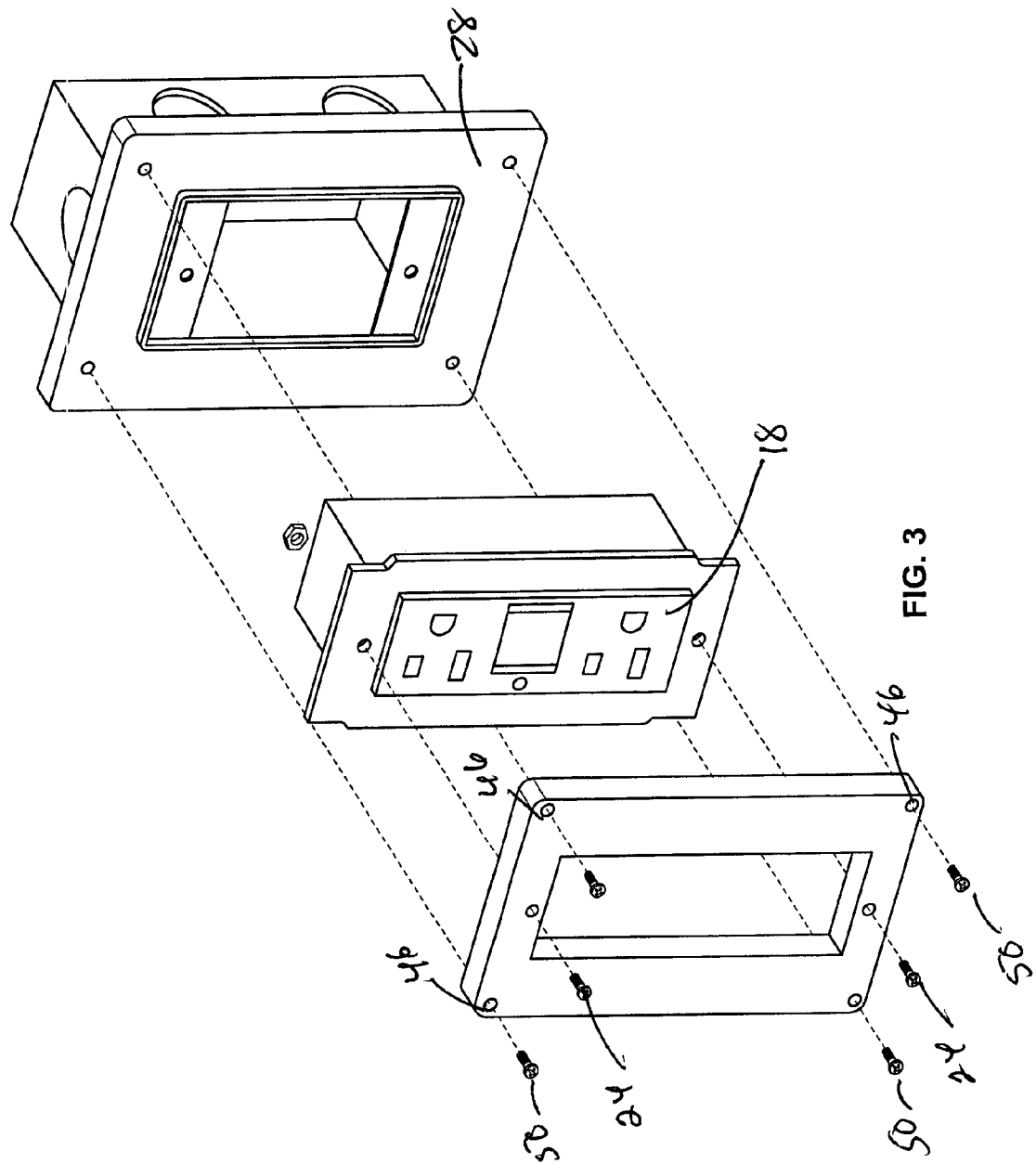
FIG. 3 is an exploded perspective view of the wall plate of the present invention.
Figure 4:
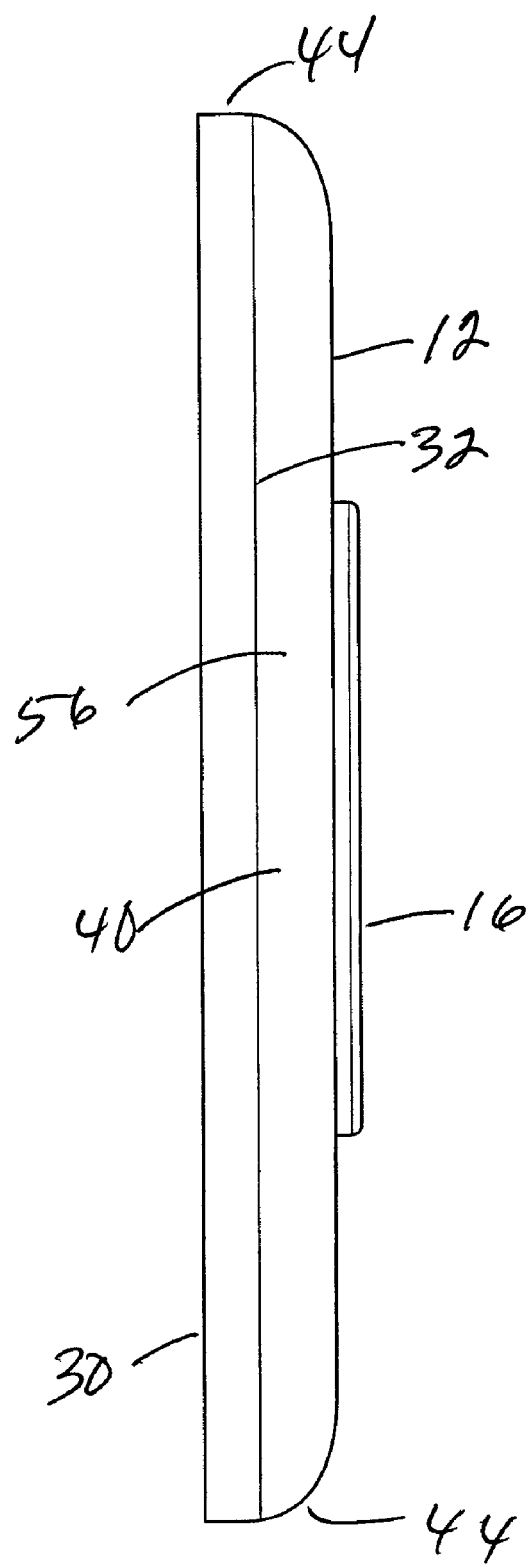
FIG. 4 is a side view of the present invention.

As shown also in FIGS. 3 and 5, insert 50 is placed in bore 46 and follows channel 52 through the exterior surface 12 and interior surface 26 to conduit 54. Conduit 54 is a hollow, cylindrical tube extending from interior surface 26 having a first end 54*a* and a second end 54*b* located distally from interior surface 26. When the wall plate 10 and electrical outlet 18 are attached to wall or planar surface 28, conduit 54, with its second end 54*b* and perimeter 30 provide rigid, secure engagement. The rigid engagement increases safety and lessens or eliminates damage to the wall plate 10 from abuse.

The height 56 of upstanding walls 32 elevates exterior and interior surfaces 12 and 26, respectively, to provide additional safety features by distancing the interior surface 26 to be elevated and away from electrical outlet 18. Upon application of excessive force to the exterior surface of the wall plate, the plate could crack. If this occurs, the electrical outlet 18 may not be disabled due to the impact resistance of the plate and the plate'distance from the electrical outlet. The contact points of engagement of the wall plate 10 to the wall 28 are the second end 54*b* of conduit 54 and perimeter 30. Thus, the elevation of the exterior and interior surfaces create a space between the interior surface 26 and the wall 28, which is beneficial in preventing damage to the outlet.

The one-piece wall plate 10 is manufactured from impact-resistant materials, preferably Acrylonitrile Butadiene Styrene (ABS). The material is smudge-proof, rustproof, and does not require painting.

FIG. 3 illustrates an exploded view of wall plate 10, with single access opening 58 for electrical outlet 18 or similar outlet that can be attached to wall plate 10 by screws 24. Tamper-resistant screws or inserts 50 pass through bore 46 and channel 52 into wall or planar surface 28. Nyloc nuts or similar anchoring devices for tamper-resistant screws or inserts 50 are not shown.

Wall plate 10 is oversized or larger than conventional wall plates, as illustrated in FIG. 3, and provides increased stability when engaging electrical outlet 18 in wall 28. The oversized configuration of the wall plate 18 allows for j-box openings and mounting surface imperfections.

While what has been shown and described is at present considered the preferred embodiment of the present invention, it will be obvious to those skilled in the art that various changes and modifications can be made without departing from the spirit and scope of the invention as defined by the appended claims.

What is claimed is:

1. An oversized wall plate having a one-piece construction for holding an electrical outlet in a wall or other planar surface comprising:

a perimeter having a plurality of upstanding walls;

an exterior surface having an opening for access to an outlet and an interior surface in communication with the upstanding wall, which has first and second parallel members and third and fourth parallel members;

corners formed by the meeting of the parallel members;

recessed bores having shoulders adjacent the corners leading to channels extending therefrom through the exterior surface and interior surface for application of inserts for securely mounting the wall plate onto a wall or other planar surface;

the interior surface having conduits for guiding the inserts to the wall or other planar surface for mounting the wall plate, said conduits providing rigid secure engagement of said wall plate to said wall.

2. The wall plate according to claim 1, wherein the exterior surface forms radius corners with the parallel members.

3. The wall plate according to claim 1, wherein the wall or other planar surface contacts the conduit and perimeter of the wall plate for securing the electrical outlet and plate.

* * * * *